United States Patent [19]
Chu

[11] Patent Number: 5,094,828
[45] Date of Patent: Mar. 10, 1992

[54] SYNTHESIS OF LARGE-PORE

[75] Inventor: Cynthia T-W. Chu, Princeton Junction, N.J.

[73] Assignee: Mobil Oil Corporation, Fairfax, Va.

[21] Appl. No.: 636,055

[22] Filed: Dec. 31, 1990

[51] Int. Cl.$^5$ ............................................. C01B 33/34
[52] U.S. Cl. ..................................... 423/328; 423/329
[58] Field of Search ............... 423/305, 306, 326, 328, 423/329, 330; 502/214, 208

[56] References Cited

U.S. PATENT DOCUMENTS 4,440,871  4/1984  Lok et al. .......................... 502/214

FOREIGN PATENT DOCUMENTS

WO8901912  3/1989  European Pat. Off. .

OTHER PUBLICATIONS

Lok et al., "The Role of Organic Molecules in Molecular Sieve Synthesis," 3 Zeolites, 1983, pp. 282-291.

Primary Examiner—R. Bruce Breneman
Attorney, Agent, or Firm—Alexander J. McKillop; Charles J. Speciale; Laurence P. Hobbes

[57]  ABSTRACT

This invention relates to a method for preparing large pore synthetic crystalline molecular sieve composition which may contain framework +3 valence element, e.g. aluminum, and one or more of a) +4 valence element, e.g. silicon, and b) +5 valence element, e.g. phosphorous. The method utilizes cyclohexylamine as directing agent in the forming mixture. The source of +3 valence element and, optionally +4 element is an alkoxide thereof, e.g., aluminum iso-propoxide. The resulting product may be used as a catalyst.

17 Claims, 9 Drawing Sheets

SYNTHESIS OF LARGE-PORE

BACKGROUND OF THE INVENTION

1. Field of the Invention

This invention relates to a new and useful improvement in synthesizing a large pore crystalline composition from a specific new reaction mixture containing cyclohexylamine as directing agent and a source of oxide of a +3 valance element X, e.g., aluminum, and at least one of i) a source of oxide of a +4 valence element Z, e.g., silicon and ii) a source of oxide of a +5 valence element Y, e.g. phosphorus.

More particularly, this invention relates to an improved method for preparing a crystalline large pore composition whereby synthesis is facilitated and reproducible and the product comprises crystals having large pore windows measuring greater than about 10 Angstroms in diameter, such as, for example, greater than about 12 Angstroms in diameter. In one particularly preferred embodiment, alkoxides are used as the source of +3 valence element oxide and/or +4 valence element oxide.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842) merely to name a few.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity. U.S. Pat. No. 4,673,559 teaches numerous different silicoaluminophosphate structures. Examples 17 and 18 of that patent show synthesis of MCM-9, a silicoaluminophosphate composition containing crystals having large pore windows measuring between 12 and 13 Angstroms in diameter.

U.S. Pat. No. No. 4,880,611 teaches compositions which comprise crystals having large pore windows of at least about 10 Angstroms, e.g., from about 12 to about 13 Angstroms, in diameter. An example of such a composition is a large pore crystalline [metallo]aluminophosphate which has a framework topology after heating at 110° C. or higher giving an X-ray diffraction pattern with interplanar d-spacings at 16.4±0.2 Angstroms, 8.2±0.1 Angstroms, 6.21±0.05 Angstroms, 6.17±0.05 Angstroms, 5.48±0.05 Angstroms and 4.74±0.05 Angstroms, and without a significant interplanar d-spacing at 13.6-13.3 Angstroms. This material and its method of preparation are further set out in the aforementioned U.S. Pat. No. No. 4,880,611 which is incorporated herein by reference. Such a composition can be prepared from a reaction mixture hydrogel containing sources of aluminum oxide, phosphorus oxide, water, and a directing agent DA, preferably tetrapropylammonium.

An early reference to a hydrated aluminum phosphate which is crystalline until heated at about 110° C., at which point it becomes amorphous or $AlPO_4$ tridymite, is the "$H_1$" phase or hydrate of aluminum phosphate of F. d'Yvoire, *Memoir Presented to the Chemical Society*. No. 392, "Study of Aluminum Phosphate and Trivalent Iron", July 6, 1961 (received), pp. 1762-1776. This material, when crystalline, is identified by the Joint Commission for Powder Diffraction Standards (JCPDS), card number 15-274, and has an X-ray diffraction pattern exhibiting lines of Tables I and II, hereinafter presented. Once heated at about 110° C., however, the d'Yvoire material becomes amorphous. The 18-membered ring aluminophosphate VPI-5 was published by M. Davis et al. at the "Innovation in Zeolite Materials Science" meeting in September, 1987. A further description of this material and its metal substituted aluminumphosphate counterparts can be found in published PCT application WO 89/ 01912, International Application Number PCT/US 88/02910 to Davis et al, filed 24 Aug. 1988 and published 9 Mar. 1989. U.S. Pat. No. 4,673,559 discloses the 18-membered ring silicoaluminophosphate MCM-9.

Silicoaluminophosphates of various structures are taught in U.S. Pat. No. 4,440,871. Aluminosilicates containing phosphorous, i.e. silico[metallo]aluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,639,357 (MCM-5) and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417 and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550 and 3,697,550.

Lok et al., 3 *Zeolites,* 282–291, (1983), teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show use of the presently required directing agent compound for synthesis of the large pore composition of this invention. However, Lok et al show that the synthesis of AlPO$_4$-5 and AlPO$_4$-17 are directed by cyclohexylamine and the use of aluminum isopropoxide to reduce crystallization rates in AlPO$_4$ synthesis.

Metal alkoxides are shown in 63 *J. Of Non-Crystalline Solids,* 35 (1984) to improve homogeneity of certain non-crystalline gels. U.S. Pat. No. 4,440,871 to Lok et al, Examples 26 and 50 teach the preparation of SAPO-17 and SAPO-44, respectively, using aluminum isopropoxide as the aluminum source in the forming mixture and cyclohexylamine as templating agent with crystallization at 200° C. Moreover, the above-mentioned PCT application WO 89/ 01912, International Application Number PCT/US 88/02910 to Davis et al, discloses the preparation of 18-membered ring large-pore AlPO$_4$ material known as VPI-5, utilizing aluminum alkoxides.

U.S. application Ser. No. 07/636,054, to Chu et al., filed on even date herewith, discloses an improvement in calcining crystalline [metallo]aluminophosphate compositions by treatment with non-oxidizing gas followed by treatment with oxygen-containing gas at high flow rates, which avoids or minimizes structural changes during calcination which can be utilized with the method of the present invention.

SUMMARY OF THE INVENTION

An improved, reproducible hydrothermal synthesis method for preparing large-pore crystalline composition exhibiting valuable properties is provided. The method comprises providing a reaction mixture hydrogel containing sources of X oxide, wherein X is a +3 valent element, at least one of Y oxide and Z oxide wherein Y is a +5 valent element and Z is a +4 valent element, inorganic cations M and anions N, water, an optional water immiscible organic solvent, and cyclohexylamine as directing agent D, having a composition, in terms of mole ratios, within the following ranges:

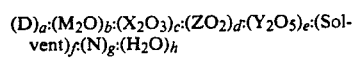

$$(D)_a:(M_2O)_b:(X_2O_3)_c:(ZO_2)_d:(Y_2O_5)_e:(Solvent)_f:(N)_g:(H_2O)_h$$

where a,b,c,d,e,f,g and h are numbers satisfying the following relationships:

a/(c+d+e) is from 0.01 to less than 4,
b/(c+d+e) is less than 2,
d/(c+e) is less than 2,
f/(c+d+e) is less than 15,
g/(c+d+e) is less than 2,
h/(c+d+e) is from 3 to 150.

In a preferred embodiment of the present invention, the source of the X oxide, and/or the optional Z oxide, is an alkoxide.

Reaction conditions required of the instant invention are critical and consist of heating the foregoing reaction mixture to a temperature of from about 105° C. to about 160° C. for a period of time of from about 1 hour to about 48 hours. A more preferred temperature range is from about 120° C. to less than about 135° C. with the amount of time at a temperature in such range being from about 2 hours to about 24 hours.

The solid product composition is recovered from the reaction medium, as by cooling the whole to room temperature, water washing and filtering.

EMBODIMENTS

Figure 1:
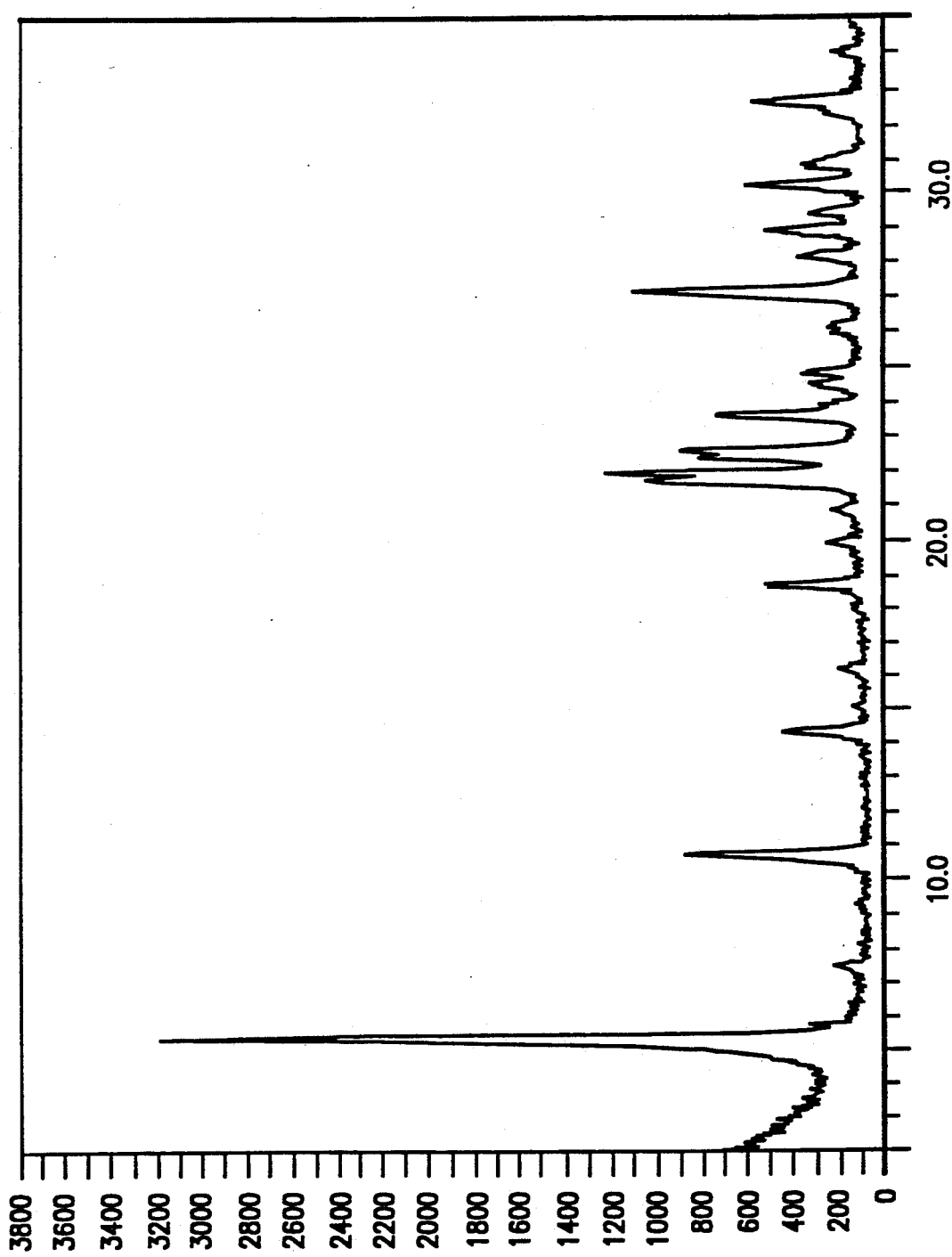
FIG. 1 depicts the X-ray diffraction pattern of the product of Example 1.

Synthesis of those large-pore crystalline compositions which are aluminophosphates, typically involves phosphoric acid and hydrated alumina. The present invention, however, relates to an improvement in such synthesis whereby the reaction mixture comprises cyclohexylamine directing agent. In one embodiment, the source of X and/or Z oxide (if present) is an alkoxide, e.g., aluminum alkoxide. By substituting the hydrated alumina with aluminum alkoxide, the pH of the reaction mixture changes and the amount of directing agent needed is lower. It is believed this changed mixture changes the interaction of the components in such a way that the crystallization product is even more noticeably improved.

The crystalline composition synthesized in accordance with the present method exhibits utility as a catalyst component for certain chemical reactions of interest, including cracking, hydrocracking, disproportionation, alkylation, isomerization, oxidation, and conversion of oxygenates, e.g. methanol, to hydrocarbons, e.g. gasoline-range hydrocarbons. The composition comprises crystals having large pore windows of at least about 10 Angstroms, e.g. from about 12 to about 13 Angstroms, diameter.

The particular effectiveness of the presently required directing agent, when compared with other directing agents, such as those identified above, is believed due to its ability to function as a template in the above reaction mixture, particularly those containing an alkoxide source of X oxide and optionally, an alkoxide source of Z oxide in the nucleation and growth of the desired large-pore crystalline compositions with the limitations above discussed.

Useful sources of +3 valence element, e.g., aluminum as non-limiting examples, include any known form of oxide or hydroxide, organic or inorganic salt or compound, preferably an alkoxy compound. Useful sources of +4 valence element, e.g., silicon, include, as non-limiting examples, any known form of dioxide or acid, e.g., silicic acid, or other compounds of such element, preferably an alkoxy compound.

The alkyl portion of the preferred alkoxy X oxide or Z oxide is preferably 2 to 5 carbon atoms, e.g., ethoxide, n-propoxide, isopropoxide, n-butoxide, sec-butoxide, isobutoxide, n-pentoxide, isopentoxide and sec-pentoxide. Examples of such compounds include aluminum isopropoxide, aluminum tri-secbutoxide, titanium isopropoxide, vanadium isopropoxide, barium isopropoxide and tetraethylorthosilicate.

The useful sources of +5 valent oxides include, as non-limiting examples, any known form of phosphorus acids, e.g. ortho-phosphoric acid, or phosphorus oxides, phosphates and phosphites, and organic derivatives of phosphorus. Other suitable sources include oxides of vanadium, e.g., $V_2O_5$.

[Metallo]aluminophosphates of the present invention can be prepared from reaction mixture hydrogel containing sources of aluminum, phosphorus, water, cyclohexylamine directing agent (D) and optionally sources of Z, as above defined, having a composition in terms of mole ratios within the following ranges:

| | |
|---|---|
| $ZO_2/Al_2O_3$ | 0 to 0.5, preferably 0 to 0.4 |
| $P_2O_5/Al_2O_3$ | 0.7 to 1.5, preferably 0.8 to 1.2 |
| $H_2O/Al_2O_3$ | 15 to 75, preferably 40 to 60 |
| $D/Al_2O_3$ | 0.2 to 0.75, preferably 0.25 to 0.5 |

It will be understood that each component utilized in the reaction mixture for preparing the present crystalline composition can be supplied by one or more essential reactants and they can be mixed together in any order. For example, a component can be supplied by an aqueous solution. The reaction mixture can be prepared either batchwise or continuously. Crystal size and crystallization time for the product composition comprising the desired composition will vary with the exact nature of the reaction mixture employed within the above-described limitations.

The synthesis of the present invention may be facilitated when the reaction mixture comprises seed crystals, such as those having the structure of the product crystals. The use of at least 0.01%, preferably about 0.10%, and even more preferably about 1% seed crystals (based on total weight) of crystalline material in the reaction mixture will facilitate crystallization in the present method.

The composition synthesized hereby can be characterized, in terms of mole ratios of oxides as follows:

$$M_{x/m}^{m+}:(XO_2)_{1-y}^-:(YO_2)_{1-x}^+:(ZO_2)_{x+y}\cdot N_{y/n}^{n-}$$

wherein X is the +3 valence element, Y is the +5 valence element, Z is the +4 valence element, M is a cation of valence m, N is an anion of valence n, and x and y are numbers of from greater than $-1$ to less than $+1$ which satisfy the relationship:

$$0 \leq x+y < 1.$$

Such materials include [metallo]aluminophosphate (wherein the metal can include metalloids such as titanium and silicon), silicoaluminate and aluminophosphate compositions.

In the composition above, when x is greater than y, the present composition is a cation exchanger with potential use as an acidic catalyst. When x is less than y, it is an anion exchanger with potential use as a basic catalyst.

In the synthesized form of the present composition, it can also contain occluded organic material, D', and water molecules, entrapped during the synthesis and filling the microporous voids. It then has the general formula:

$$vD':M_{x/m}^{m+}:(XO_2)_{1-y}^-:(YO_2)_{1-x}^+:(ZO_2)_{x+y}\cdot N_{y/n}^{n-}:w(H_2O)$$

wherein v is the number of moles of D', occluded organic material resulting from organic directing agent (D) and/or solvent used in synthesis of and filling microporous voids of the composition, which material may be removed upon calcination, w is moles of $H_2O$, e.g. from 0 to about 5, and x and y are the numbers defined above.

The composition of matter prepared by the present invention exhibits a valuable combination of catalytic, sorption and ion-exchange properties.

The composition prepared by the present invention may comprise one or more +3 valence elements, such as those selected from the group consisting of aluminum, iron, chromium, vanadium, molybdenum, arsenic, antimony, manganese, gallium and boron; one or more +4 valence elements, such as those selected from the group consisting of silicon, germanium and titanium; and one or more +5 valence elements, such as those selected from the group consisting of phosphorous, arsenic, antimony and vanadium, in the structure thereof.

The composition prepared by the present invention can exhibit unique and useful catalytic, sorptive and shape selective properties along with a +4 valence element/(+3 valence element plus +5 valence element), e.g. silicon/(aluminum+phosphorus), atomic ratio of less than unity, but greater than or equal to zero, e.g. from about 0.001 to 0.99. It is well recognized that aluminum phosphates exhibit a phosphorus/aluminum atomic ratio of only 0.8 to 1.2 and contain essentially no structural silicon. Also, the phosphorus-substituted zeolite compositions, sometimes referred to as "aluminosilicophosphate zeolites", have a silicon/aluminum atomic ratio of from 0.66 to 8.0, and a phosphorus/aluminum atomic ratio of from greater than 0 to 1.0.

The original cations of the as-synthesized present composition can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the composition catalytically active or control catalytic activity, especially for hydrocarbon conversion. These include hydrogen, rare earth metal and metals of Groups IA, IIA, IIIA, IVA, IB, IIB, IIIB, IVB, VIB and VIII of the Periodic Table of the Elements.

Typical ion exchange technique would be to contact the synthetic present composition with a salt of the desired replacing cation or cations. Examples of such salts include the halides, e.g. chlorides, nitrates and sulfates.

Framework topologies of the present composition containing +4 valence element, e.g. silicon, +5 valence element, e.g. phosphorus, and +3 valence element, e.g. aluminum, in tetrahedrally coordinated structural positions are not those of layered materials, but are rigid 3-dimensional crystals.

The crystalline composition of the present invention can be beneficially thermally treated, either before or after ion exchange. This thermal treatment is performed by heating the composition in an atmosphere such as air, nitrogen, hydrogen, steam, etc., at a temperature of from about 300° C. to about 1100° C., preferably from about 350° C. to about 750° C., for from about 1 minute to about 20 hours. While subatmospheric or superatmospheric pressures may be used for this thermal treatment, atmospheric pressure is desired for reasons of convenience.

The present composition exhibits, even after being heated at 110° C. or higher, an X-ray diffraction pattern which distinguishes it from other prior crystalline compositions. The X-ray diffraction pattern of this composition may have the following characteristic values:

TABLE 1A

| Interplanar d-Spacings (A) | Relative Intensity |
| --- | --- |
| 16.4 ± 0.2 | vs |
| 8.2 ± 0.1 | w |
| 4.74 ± 0.05 | w | and more specifically the following characteristic values:

TABLE 1B

| Interplanar d-Spacings (A) | Relative Intensity |
| --- | --- |
| 16.4 ± 0.2 | vs |
| 8.2 ± 0.1 | w |
| 6.21 ± 0.05 | w |
| 6.17 | |
| 5.48 ± 0.05 | w |
| 4.74 ± 0.05 | w | and even more specifically the following characteristic values:

TABLE 1C

| Interplanar d-Spacings (A) | Relative Intensity |
| --- | --- |
| 16.4 ± 0.2 | vs |
| 8.2 ± 0.1 | w |
| 6.21 ± 0.05 | w |
| 6.17 | |
| 5.48 ± 0.05 | w |
| 4.74 ± 0.05 | w |
| 4.10 ± 0.04 | w |
| 4.05 ± 0.04 | w |
| 3.96 ± 0.04 | w |
| 3.94 | |
| 3.76 ± 0.03 | w |
| 3.28 ± 0.03 | w |

The X-ray diffraction lines in Tables 1A, 1B and 1C identify a crystal framework topology in the composition exhibiting large pore windows of 18-membered ring size. The pores are at least about 12 Angstroms, e.g. 12-13 Angstroms in diameter. These lines distinguish this topology from other crystalline aluminosilicate, aluminophosphate and silicoaluminophosphate structures. It is noted that the X-ray pattern of the present composition is void of a d-spacing value at 13.6-13.3 Angstroms With any significant intensity relative the strongest d-spacing value. If a d-spacing value in this range appears in a sample of the present composition, it is due to impurity and will have a weak relative intensity. An 18-membered ring structure was published by M. Davis, D. Saldarriaga, C. Montes and J. Garces at the "Innovation in Zeolite Materials Science" meeting in Nieuwpoort, Belgium, Sept. 13-17, 1987. The large pore "AlPO$_4$-8" of U.S. Pat. No. 4,310,440 has a d-spacing value at 13.6-13.3 Angstroms with a medium-very strong relative intensity as reported in the patent. The d'Yvoire aluminum phosphate identified above, i.e. JCPDS card number 15-274, is not crystalline after being heated at about 110° C. or else changes to tridymite.

These X-ray diffraction data were collected with conventional X-ray systems, using copper K-alpha radiation. The positions of the peaks, expressed in degrees 2 theta, where theta is the Bragg angle, were determined by scanning 2 theta. The interplanar spacings, d, measured in Angstrom units (A), and the relative intensities of the lines, I/I$_o$, where I$_o$ is one-hundredth of the intensity of the strongest line, including subtraction of the background, were derived. The relative intensities are given in terms of the symbols vs=very strong (75-100%), s=strong (50-74%), m=medium (25-49%) and w=weak (0-24%). It should be understood that this X-ray diffraction pattern is characteristic of all the species of the present compositions. Ion exchange of cations with other ions results in a composition which reveals substantially the same X-ray diffraction pattern with some minor shifts in interplanar spacing and variation in relative intensity. Relative intensity of individual lines may also vary relative the strongest line when the composition is chemically treated, such as by dilute acid treatment. Other variations can occur, depending on the +4 valence element/+3 valence element, e.g. silicon/aluminum, and the +5 valence element/+3 valence element, e.g. phosphorus/aluminum, ratios of the particular sample, as well as its degree of thermal treatment. The relative intensities of the lines are also susceptible to changes by factors such as sorption of water, hydrocarbons or other components in the channel structure. Further, the optics of the X-ray diffraction equipment can have significant effects on intensity, particularly in the low angle region. Intensities may also be affected by preferred crystallite orientation.

The crystalline composition of this invention may be converted to the dry, hydrogen form by the above thermal treatment of the organic cation-containing form or hydrogen ion precursor-containing form resulting from ion exchange.

In general, the composition of the present invention can be prepared by any suitable means, such as, for example, from a two-phase reaction mixture by:

1) providing a reaction mixture comprising sources of X oxide, Y oxide and Z oxide, wherein X represents one or more elements of +3 valence, for example those selected from the group consisting of aluminum, iron, chromium, vanadium, molybdenum, arsenic, antimony, manganese, gallium and boron; Y represents one or more elements of +5 valence, for example those selected from the group consisting of, for example, phosphorous, arsenic, antimony and vanadium; Z represents one or more elements of +4 valence, for example those selected from the group consisting of silicon, germanium and titanium, one of said oxide sources being unstable in water, an organic directing agent D, inorganic cations M and anions N, and a substantially water-immiscible organic solvent for said oxide source unstable in the water, the components of said reaction mixture having the following relationship:

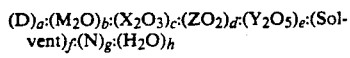

where a, b, c, d, e, f, g, and h are numbers satisfying the following relationships:
a/(c+d+e) is from 0.01 to less than 4,
b/(c+d+e) is less than 2,
d/(c+e) is less than 2,
f/(c+d+e) is less than 15,
g/(c+d+e) is less than 2,
h/(c+d+e) is from 3 to 150.

wherein upon initial provision of said reaction mixture said oxide source unstable in the water is dispersed or dissolved in the water-immiscible organic solvent;

2) heating said reaction mixture at a rate of from 5° C. to 50° C. per hour to a temperature of from 80° C. to 130° C.;

3) agitating said reaction mixture in a manner sufficient to intimately admix the water-immiscible organic solvent and the water with each other, thereby progressively hydrolyzing the oxide source unstable in water;

4) maintaining said agitated reaction mixture at a temperature of from 120° to 150° C. until crystals of oxide material are formed; and 5) recovering from said reaction mixture a composition characterized, in the anhydrous state, as follows:

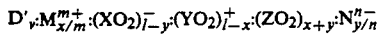

wherein D' represents the total of organic directing agent D plus organic solvent, v is the number of moles of D', m is the valence of cation M, n is the valence of anion N, and x and y are numbers of from greater than −1 to less than +1 which satisfy the relationships:

(1) if x is 0, then y is not 0,
(2) if y is 0, then x is not 0, and
(3) x + y is less than 1.

The above reaction mixture composition can be prepared utilizing materials which supply the appropriate components. The aqueous phase components may include from the sources of the +3, +4 or +5 valence elements, e.g. silicon, phosphorus, or aluminum, those not included in the water-immiscible, e.g. organic, phase. The organic phase comprises an organic solvent and a source of at least one of the +3, +4 or +5 valence elements, e.g. silicon, phosphorus, or aluminum, insoluble in the aqueous phase under reaction conditions. The aqueous phase can also contain the required directing agent.

The organic solvent is a $C_5$–$C_{10}$ alcohol or any other liquid compound substantially immiscible with water, as non-limiting examples.

The composition prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

It may be desired to incorporate the composition prepared by this invention with another material, i.e. a matrix, resistant to the temperatures and other conditions employed in various organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Catalyst compositions containing the present composition will generally comprise from about 1% to 90% by weight of the present composition and from about 10% to 99% by weight of the matrix material. More preferably, such catalyst compositions will comprise from about 2% to 80% by weight of the present composition and from about 20% to 98% by weight of the matrix.

Use of a material which itself is active, in conjunction with the composition of the present method, i.e. combined therewith, tends to alter the conversion and/or selectivity of the overall catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It may be desirable to provide a catalyst having good crush strength because in commercial use it is desirable to prevent the catalyst from breaking down into powder-like materials. These clay binders have been employed normally only for the purpose of improving the crush strength of the overall catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Employing a catalytically active form of the present composition as a catalyst component, said catalyst possibly containing additional hydrogenation components, reforming stocks can be reformed employing a temperature of from about 370° C. to about 540° C., a pressure of from about 100 psig to about 1000 psig (791 to 6996 kPa), preferably from about 200 psig to about 700 psig (1480 to 4928 kPa), a liquid hourly space velocity is from about about 0.1 to about 10, preferably from about 0.5 to about 4, and a hydrogen to hydrocarbon mole ratio of from about 1 to about 20, preferably from about 4 to about 12.

A catalyst comprising the present composition can also be used for hydroisomerization of normal paraffins, when provided with a hydrogenation component, e.g. platinum. Such hydroisomerization is carried out at a temperature of from about 90° C. to about 375° C., preferably from about 145° C. to about 290° C., with a liquid hourly space velocity of from about 0.01 to about 2, preferably from about 0.25 to about 0.50, and with a hydrogen to hydrocarbon mole ratio of from about 1:1 to about 5:1. Additionally, such a catalyst can be used for olefin or aromatic isomerization, employing a temperature of from about 200° C. to about 480° C.

Such a catalyst can also be used for reducing the pour point of gas oils. This reaction is carried out at a liquid hourly space velocity of from about 10 to about 30 and at a temperature of from about 425° C. to about 595° C.

Other reactions which can be accomplished employing a catalyst comprising the composition of this invention containing a metal, e.g. platinum, include hydrogenation-dehydrogenation reactions and desulfurization reactions, olefin polymerization (oligomerization) and other organic compound conversions, such as the conversion of alcohols (e.g. methanol) or ethers (e.g. dimethylether) to hydrocarbons, and the alkylation of aromatics (e.g. benzene) in the presence of an alkylating agent (e.g. ethylene).

In the examples, whenever adsorption data are set forth for comparison of sorptive capacities for various adsorbants, they were determined as follows:

A weighed sample of the calcined adsorbant was contacted with a flowing stream of the equilibrium vapor of the adsorbate at 25° C., admixed with dry nitrogen Adsorbates were water vapor and n-hexane, 2-methylpentane, xylene or cyclohexane vapors. The sample temperature was maintained at 90° C. for adsorbates other than ortho-xylene for which it was 120° C. and water for which it was 60° C. The increase in weight was measured gravimetrically and converted to the adsorption capacity of the sample in weight percent of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in *The Journal of Catalysis*, 6, pp. 522–529 (August 1965), and in *The Journal of Catalysis*, 61, p. 395 (1980), each incorporated herein by reference as to that description.

When ion-exchange capacity is examined, it is determined by titrating with a solution of sulfamic acid the gaseous ammonia evolved during the temperature programmed decomposition of the ammonium-form of the present composition The method is described in *Thermochimica Acta*, Vol. III, pp. 113–124, 1971 by G. T. Kerr and A. W. Chester, incorporated herein by reference as to that description.

In order to more fully illustrate the nature of the invention and the manner of practicing the same, the following examples are presented.

EXAMPLE 1

A mixture containing 22.5 g of 85% orthophosphoric acid ($H_3PO_4$) and 39.37 g aluminum iso-propoxide in 45.25 g water was predigested at room temperature with stirring for 2 hours. To this mixture were added 8.38 g Ludox (AS-40), a colloidal dispersion of silica, and 3.18 g cyclohexylamine as directing agent (D). The mixture was stirred at room temperature for another hour.

The reaction mixture was placed in a 300 cc autoclave. Crystallization in the autoclave wa effected at 130° C. at autogenous pressure for 18 hours. The solid product was filtered, washed, dried and analyzed. Washing was accomplished by extraction with water in a Soxhlet apparatus. Analysis showed the product to contain 11.1% Si, 39.2% P and 49.7% Al, percentages atomic. The product was calcined at 530° C. in air for 10 hours.

The X-ray diffraction pattern of the as-synthesized product crystals is shown in FIG. 1, with the diffraction data presented in Table II.

TABLE II

| Interplanar d-Spacings (A) | Observed 2x Theta | Relative Intensities (I/I°) |
|---|---|---|
| 16.456 | 5.37 | 100 |
| 8.222 | 10.76 | 20 |
| 6.206 | 14.27 | 3 |
| 6.168 | 14.36 | 5 |
| 5.481 | 16.17 | 2 |
| 4.745 | 18.70 | 8 |
| 4.097 | 21.69 | 13 |
| 4.056 | 21.91 | 16 |
| 3.974 | 22.37 | 8 |
| 3.938 | 22.58 | 11 |
| 3.771 | 23.59 | 12 |
| 3.282 | 27.18 | 13 |

EXAMPLE 2

A mixture containing 19.4 g of 85% orthophosphoric acid ($H_3PO_4$) and 34.72 g aluminum iso-propoxide in 40.25 g water was predigested at room temperature with stirring for 2 hours. To this mixture were added 16.5 g Ludox (AS-40), a colloidal dispersion of silica, and 3.18 g cyclohexylamine as directing agent (D). The mixture was stirred at room temperature for another hour.

The reaction mixture was placed in a 300 cc autoclave. Crystallization in the autoclave was effected at 130° C. at autogenous pressure for 20 hours. The solid product was filtered, washed, dried and analyzed. Washing was accomplished by extraction with water in a Soxhlet apparatus. Analysis showed the product to contain 23.6% Si, 36.7% P and 39.7% Al, percentages atomic.

Figure 2:
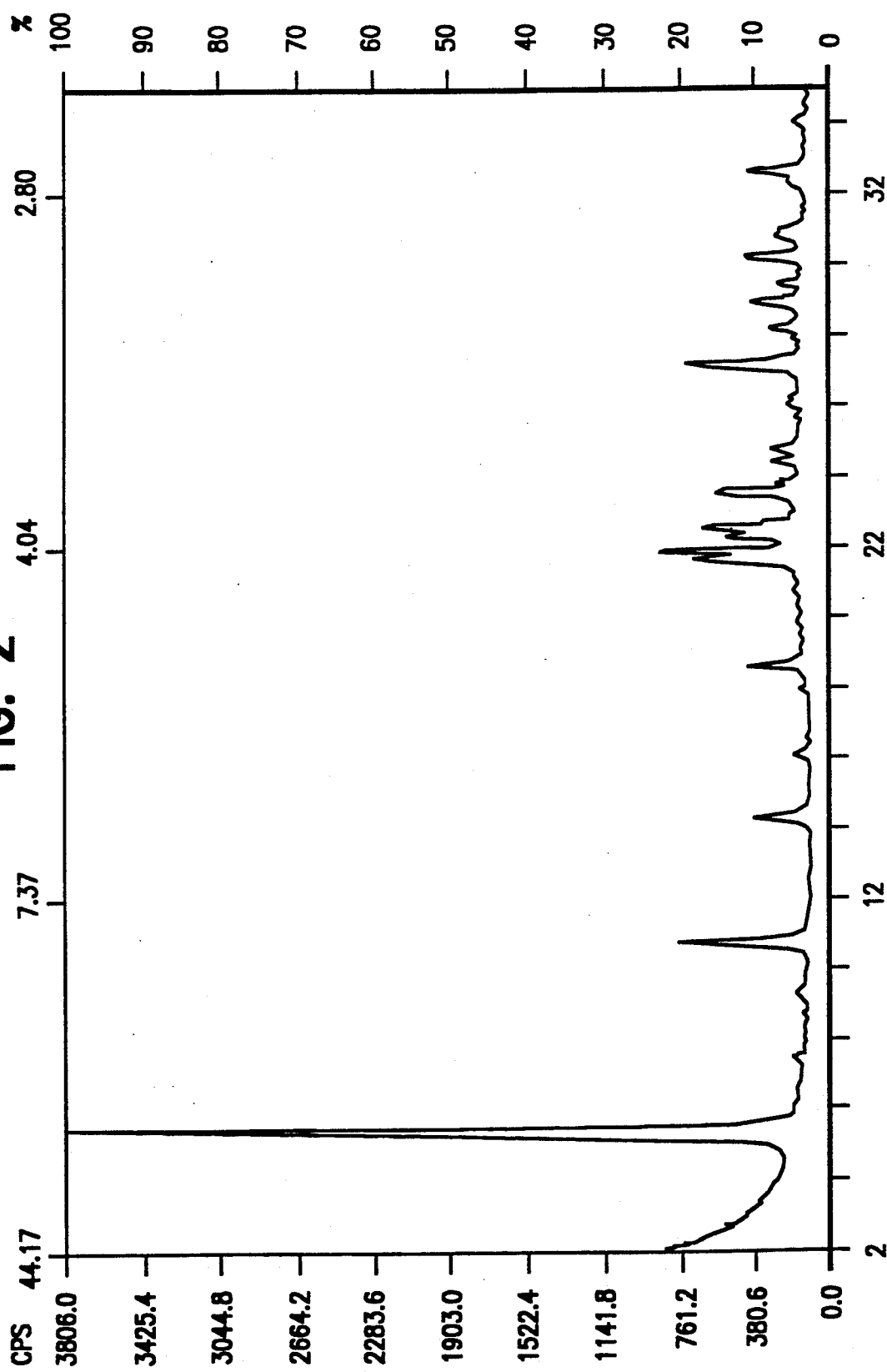
FIG. 2 depicts the X-ray diffraction pattern of the product of Example 2.

The X-ray diffraction pattern of the as-synthesized product crystals is shown in FIG. 2, with the diffraction data presented in Table III.

TABLE III

| Interplanar d-Spacings (A) | Observed 2x Theta | Relative Intensities (I/I*) |
| --- | --- | --- |
| 16.549 | 5.34 | 100 |
| 9.489 | 9.32 | 1 |
| 8.237 | 10.74 | 19 |
| 6.202 | 14.28 | 3 |
| 6.159 | 14.38 | 5.4 |
| 5.485 | 16.16 | 2 |
| 4.933 | 17.98 | 1 |
| 4.748 | 18.69 | 8 |
| 4.097 | 21.69 | 14 |
| 4.055 | 21.92 | 19 |
| 3.974 | 22.37 | 9 |
| 3.936 | 22.59 | 12 |
| 3.771 | 23.59 | 12 |
| 3.728 | 23.87 | 2 |
| 3.636 | 24.48 | 3 |
| 3.588 | 24.81 | 4 |
| 3.280 | 27.19 | 16 |
| 3.16 | 28.21 | 4 |
| 3.08 | 28.98 | 7 |
| 3.03 | 29.49 | 3 |

EXAMPLE 3

A mixture containing 22.5 g of 85% orthophosphoric acid ($H_3PO_4$) and 39.4 g aluminum iso-propoxide in 45.2 g water was predigested at room temperature with stirring for 2 hours. To this mixture were added 3.18 g cyclohexylamine as directing agent (D). The mixture was stirred at room temperature for another hour.

The reaction mixture was placed in a 300 cc autoclave. Crystallization in the autoclave was effected at 130° C. at autogenous pressure for 18 hours. The solid product was filtered, washed, dried and analyzed. The product was composed of 50.7% P and 49.3% Al, percentages atomic.

Figure 3:
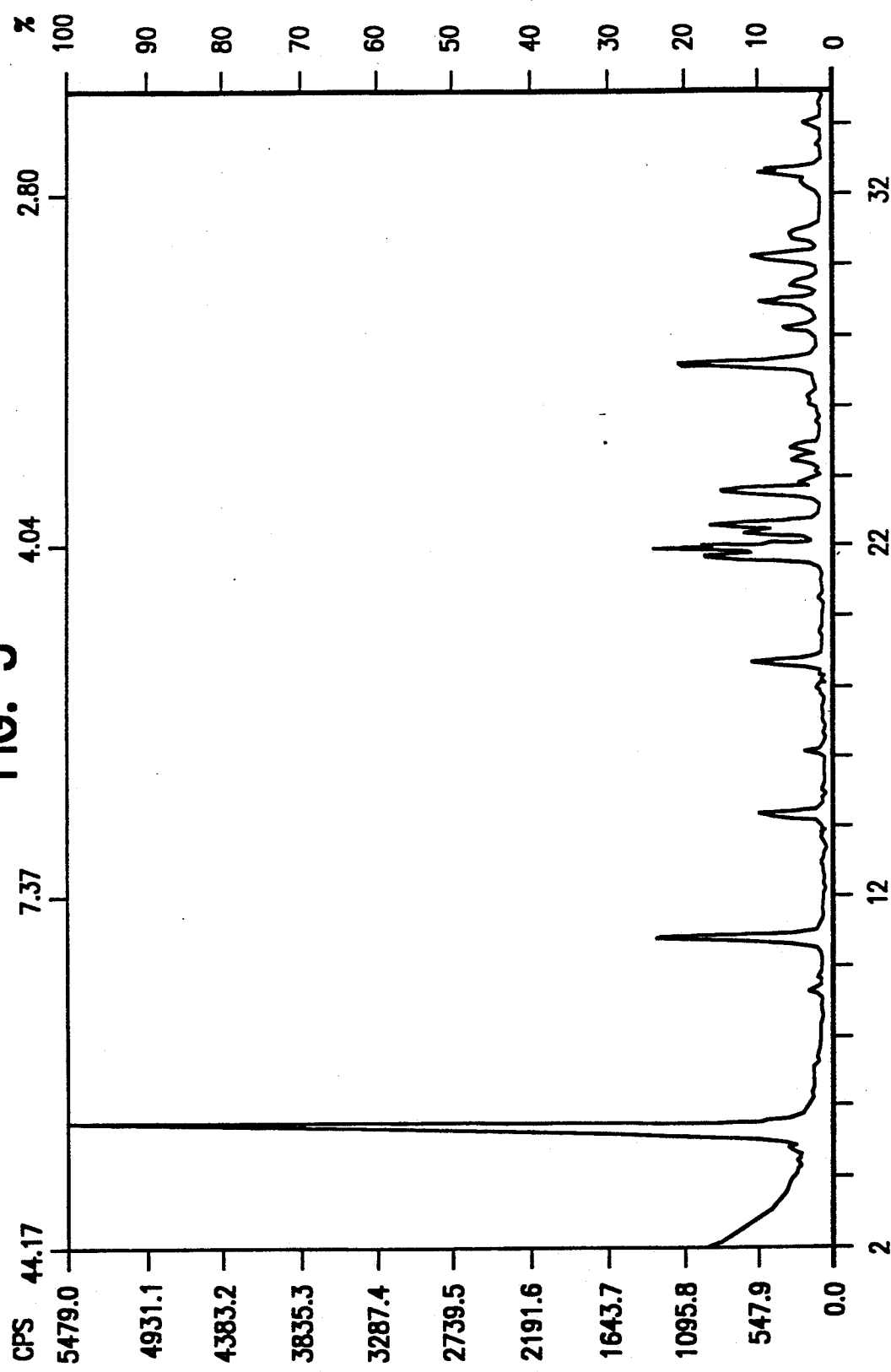
FIG. 3 depicts the X-ray diffraction pattern of the product of Example 3.

The X-ray diffraction pattern of the as-synthesized product crystals is shown in FIG. 3, with the diffraction data presented in Table IV.

TABLE IV

| Interplanar d-Spacings (A) | Observed 2x Theta | Relative Intensities (I/I*) |
| --- | --- | --- |
| 16.518 | 5.35 | 100 |
| 9.509 | 9.30 | 1 |
| 8.230 | 10.75 | 21 |
| 6.215 | 14.25 | 3 |
| 6.168 | 14.36 | 8 |
| 5.485 | 16.16 | 2 |
| 4.933 | 17.98 | 1 |
| 4.748 | 18.69 | 9 |
| 4.097 | 21.69 | 15 |
| 4.055 | 21.92 | 22 |
| 3.974 | 22.37 | 10 |
| 3.936 | 22.59 | 13 |
| 3.728 | 23.87 | 2 |
| 3.636 | 24.48 | 4 |
| 3.587 | 24.82 | 18 |
| 3.420 | 26.05 | 1 |
| 3.399 | 26.22 | 1 |
| 3.281 | 27.18 | 18 |
| 3.164 | 28.20 | 4 |
| 3.082 | 28.97 | 8 |
| 3.030 | 29.48 | 4 |

EXAMPLE 4

A mixture containing 22.5 g of 85% orthophosphoric acid ($H_3PO_4$) and 39.4 g aluminum iso-propoxide in 45.2 g water was predigested at room temperature with stirring for 2 hours. To this mixture were added 2.0 g cyclohexylamine as directing agent (D). The mixture was stirred at room temperature for another hour. The reaction mixture was placed in a 300 cc autoclave. Crystallization in the autoclave was effected at 130° C. at autogenous pressure for 18 hours. The solid product was filtered, washed, dried and analyzed. Washing was accomplished by extraction with water in a Soxhlet apparatus.

Figure 4:
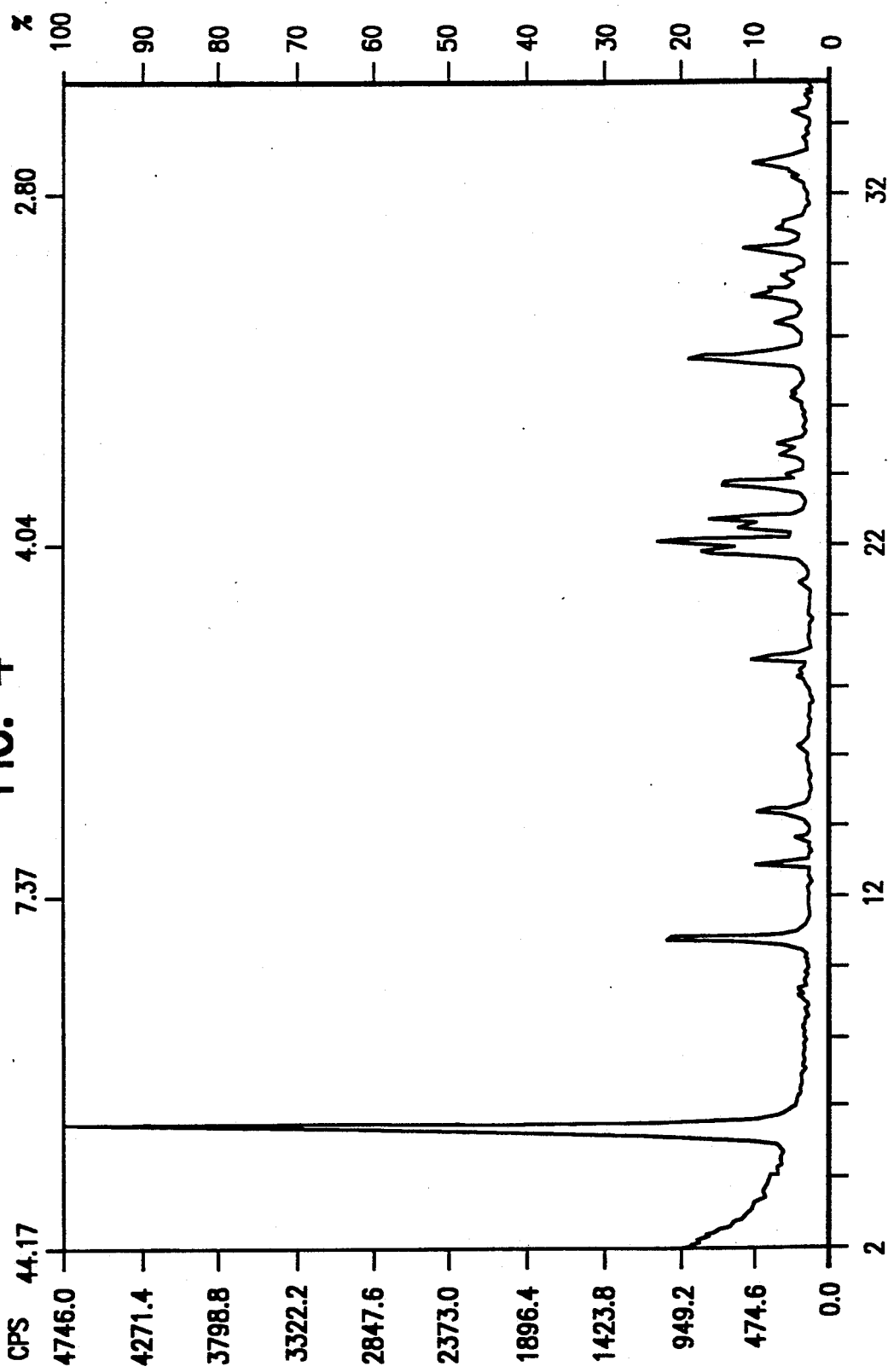
FIG. 4 depicts the X-ray diffraction pattern of the product of Example 4.

The X-ray diffraction pattern of the as-synthesized product crystals is shown in FIG. 4, with the diffraction data presented in Table V.

TABLE V

| Interplanar d-Spacings (A) | Observed 2x Theta | Relative Intensities (I/I*) |
| --- | --- | --- |
| 16.426 | 5.38 | 100 |
| 9.686 | 9.13 | 1 |
| 9.479 | 9.33 | 1 |
| 8.207 | 10.78 | 19 |
| 6.857 | 12.91 | 8 |
| 6.496 | 13.63 | 2 |
| 6.176 | 14.34 | 5 |
| 6.146 | 14.41 | 4 |
| 5.471 | 16.20 | 2 |
| 4.877 | 18.19 | 8 |
| 4.737 | 18.73 | 8 |
| 4.090 | 21.73 | 13 |
| 4.046 | 21.97 | 19 |
| 3.967 | 22.41 | 8 |
| 3.927 | 22.64 | 12 |
| 3.763 | 23.63 | 11 |
| 3.721 | 23.92 | 2 |
| 3.627 | 24.54 | 3 |
| 3.581 | 24.86 | 3 |
| 3.415 | 26.09 | 1 |
| 3.3923 | 26.27 | 1 |
| 3.275 | 27.23 | 15 |
| 3.159 | 28.25 | 4 |
| 3.076 | 29.03 | 7 |
| 3.024 | 29.54 | 3 |

EXAMPLE 5

A mixture containing 22.5 g of 85% orthophosphoric acid ($H_3PO_4$) and 49.5 g aluminum tri-secbutoxide (97 wt. %) in 45.2 g water was predigested at room temperature with stirring for 2 hours. To this mixture were added 3.18 g cyclohexylamine as directing agent (D).

The mixture was stirred at room temperature for another hour.

The reaction mixture was placed in a 300 cc autoclave. Crystallization in the autoclave was effected at 130° C. at autogenous pressure for 18 hours. The solid product was filtered, washed, dried and analyzed. The product was composed of 49.8% P and and 50.2% Al, percentages atomic.

Figure 5:
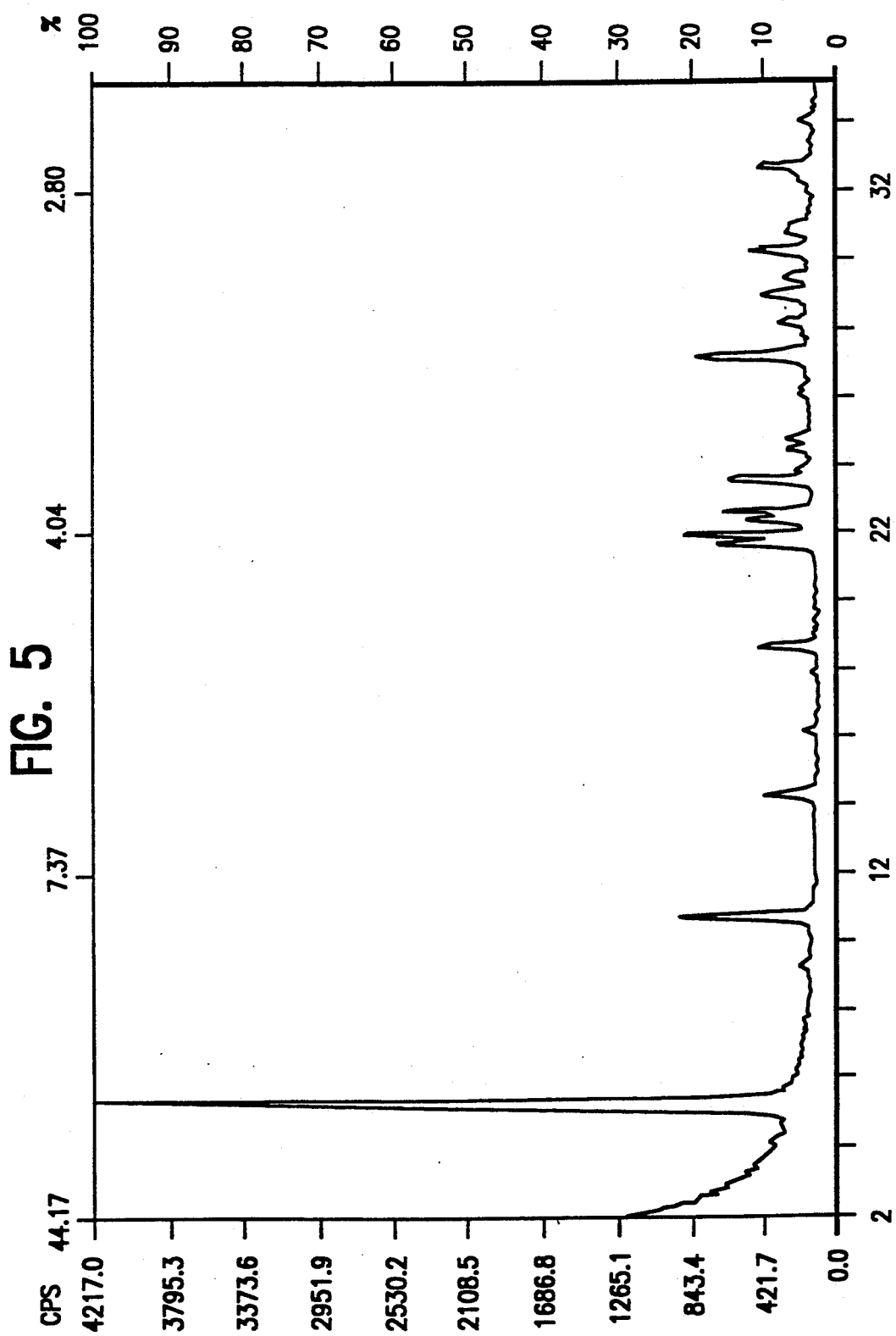
FIG. 5 depicts the X-ray diffraction pattern of the product of Example 5.

The X-ray diffraction pattern of the as-synthesized product crystals is shown in FIG. 5, with the diffraction data presented in Table VI.

TABLE VI

| Interplanar d-Spacings (A) | Observed 2x Theta | Relative Intensities (I/I°) |
|---|---|---|
| 16.487 | 5.36 | 100 |
| 9.499 | 9.31 | 2 |
| 8.230 | 10.75 | 19 |
| 6.202 | 14.28 | 3 |
| 6.159 | 14.38 | 7 |
| 5.481 | 16.17 | 2 |
| 4.782 | 18.71 | 8 |
| 4.093 | 21.71 | 13 |
| 4.040 | 21.97 | 18 |
| 3.971 | 22.39 | 9 |
| 3.929 | 22.63 | 12 |
| 3.770 | 23.60 | 12 |
| 3.720 | 23.92 | 2 |
| 3.629 | 24.53 | 4 |
| 3.584 | 24.84 | 3 |
| 3.277 | 27.21 | 16 |
| 3.161 | 28.23 | 4 |
| 3.078 | 29.01 | 7 |
| 3.025 | 29.53 | 3 |

EXAMPLE 6

A solution containing 22.5 g of 85% orthophosphoric acid ($H_3PO_4$) in 45.2 g water was added slowly to a mixture of 49.5 g aluminum tri-secbutoxide (97 wt. %) with 3.18 g cyclohexylamine as directing agent (D). The mixture was predigested at room temperature with stirring for 2 hours.

The reaction mixture was placed in a 300 cc autoclave. Crystallization in the autoclave was effected at 130° C. at autogenous pressure for 18 hours. The solid product was filtered, washed, dried and analyzed Washing was accomplished by extraction with water in a Soxhlet apparatus. Analysis proved the product to contain 52.5% P and 47.8% Al, percentages atomic.

Figure 6:
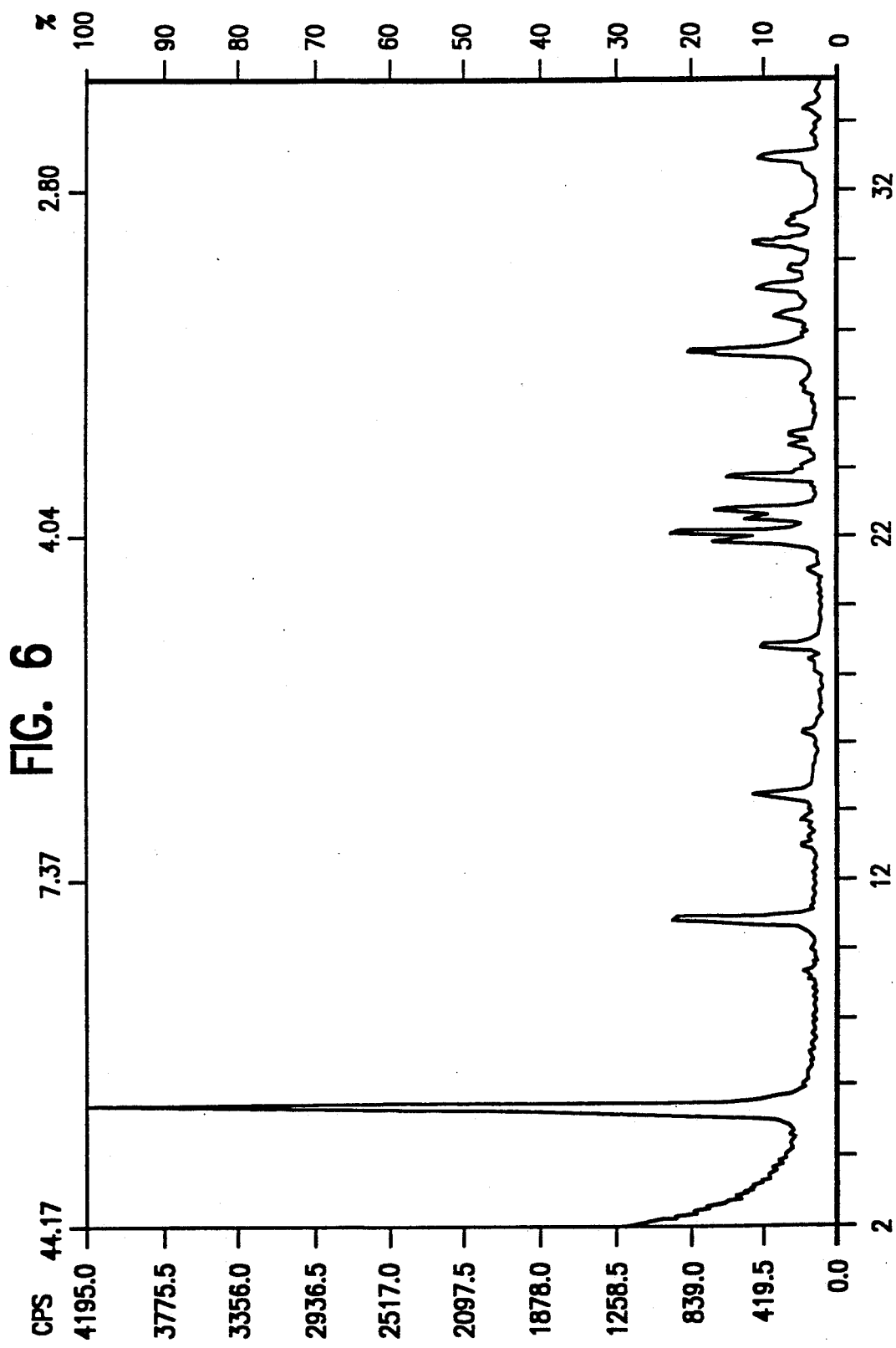
FIG. 6 depicts the X-ray diffraction pattern of the product of Example 6.

The X-ray diffraction pattern of the as-synthesized product crystals is shown in FIG. 6, with the diffraction data presented in Table VII.

TABLE VII

| Interplanar d-Spacings (A) | Observed 2x Theta | Relative Intensities (I/I°) |
|---|---|---|
| 16.395 | 5.39 | 100 |
| 9.458 | 9.34 | 1 |
| 8.199 | 10.79 | 20 |
| 6.189 | 14.31 | 4 |
| 6.142 | 14.42 | 8 |
| 5.464 | 16.22 | 2 |
| 4.732 | 18.75 | 9 |
| 4.084 | 21.76 | 14 |
| 4.040 | 22.00 | 20 |
| 3.962 | 22.44 | 9 |
| 3.924 | 22.67 | 13 |
| 3.762 | 23.65 | 12 |
| 3.715 | 23.95 | 2 |
| 3.623 | 24.56 | 3 |
| 3.577 | 24.88 | 4 |
| 3.271 | 27.25 | 16 |
| 3.154 | 28.28 | 4 |
| 3.072 | 29.06 | 7 |

TABLE VII-continued

| Interplanar d-Spacings (A) | Observed 2x Theta | Relative Intensities (I/I°) |
|---|---|---|
| 3.022 | 29.56 | 3 |

EXAMPLE 7

A solution containing 22.5 g of 85% orthophosphoric acid ($H_3PO_4$) in 45.2 g water was added slowly to a mixture of 49.5 g aluminum tri-secbutoxide (97 wt. %), 12.9 g tetrabutylsilicate and 3.18 g cyclohexylamine as directing agent (D). The mixture was predigested at room temperature with stirring for 2 hours.

The reaction mixture was placed in a 300 cc autoclave. Crystallization in the autoclave was effected at 130° C. at autogenous pressure for 18 hours. The solid product was filtered, washed, dried and analyzed. Washing was accomplished by extraction with water in a Soxhlet apparatus. Analysis proved the product to contain 7.6% Si, 43.7% P, and 48.7% Al, percentages atomic.

Figure 7:
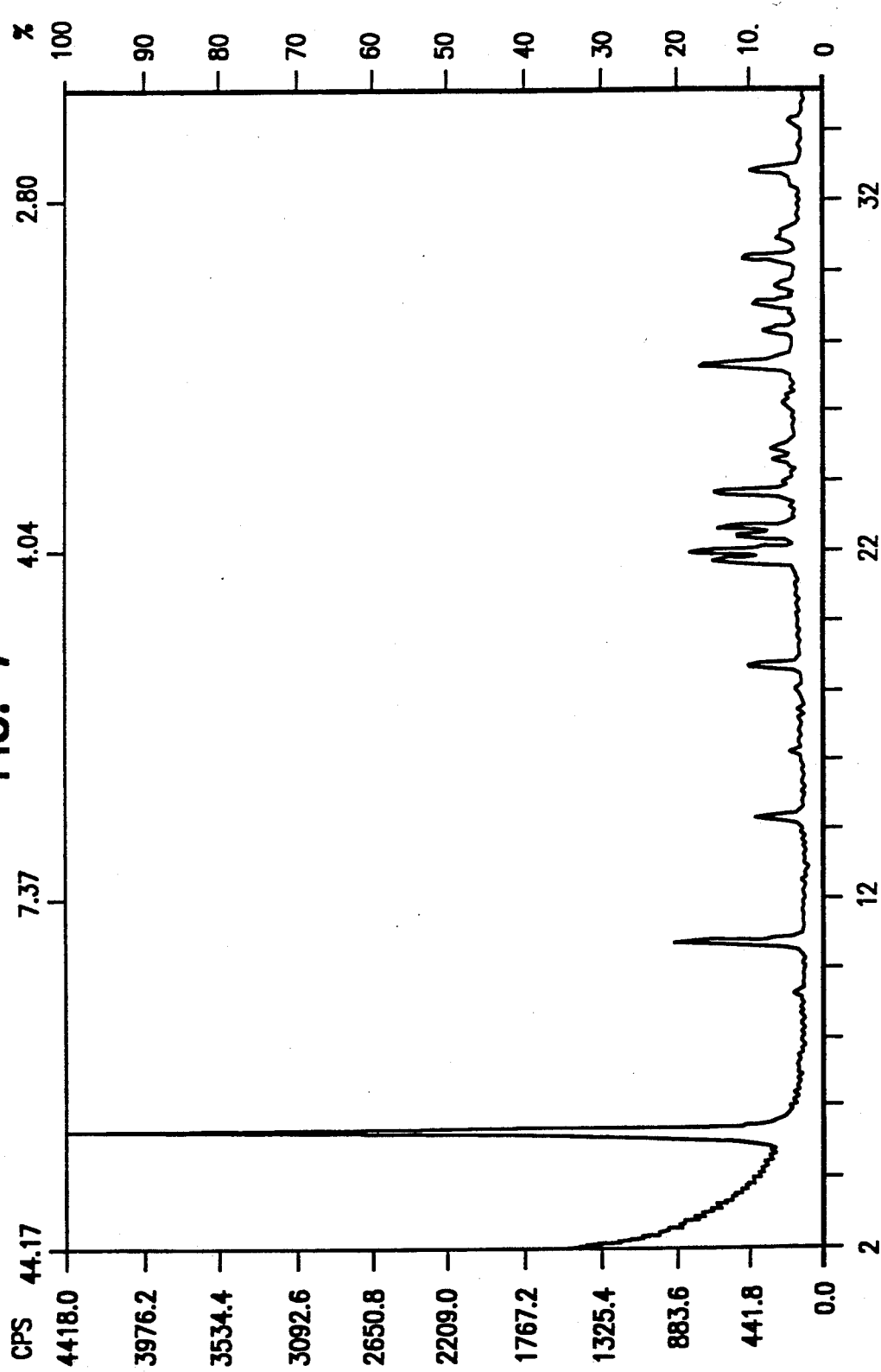
FIG. 7 depicts the X-ray diffraction pattern of the product of Example 7.

The X-ray diffraction pattern of the as-synthesized product crystals is shown in FIG. 7, with the diffraction data presented in Table VIII.

TABLE VIII

| Interplanar d-Spacings (A) | Observed 2x Theta | Relative Intensities (I/I°) |
|---|---|---|
| 16.487 | 5.36 | 100 |
| 9.50 | 9.31 | 1 |
| 8.222 | 10.76 | 18 |
| 6.211 | 14.26 | 2 |
| 5.16 | 14.37 | 6 |
| 5.48 | 16.18 | 2 |
| 4.93 | 18.00 | 1 |
| 4.74 | 18.71 | 7 |
| 4.09 | 21.72 | 11 |
| 4.05 | 21.96 | 14 |
| 3.969 | 22.40 | 7 |
| 3.931 | 22.62 | 10 |
| 3.768 | 23.61 | 10 |
| 3.721 | 23.91 | 2 |
| 3.636 | 24.52 | 3 |
| 3.58 | 24.85 | 3 |
| 3.28 | 27.22 | 13 |
| 3.16 | 28.24 | 4 |
| 3.08 | 29.01 | 5 |
| 3.02 | 29.52 | 2 |

EXAMPLE 8

A solution containing 22.5 g of 85% orthophosphoric acid ($H_3PO_4$) in 45.2 g water was added slowly to a mixture of 49.5 g aluminum tri-secbutoxide (97 wt. %), 25.78 g tetrabutylsilicate and 3.18 g cyclohexylamine as directing agent (D). The mixture was predigested at room temperature with stirring for 2 hours. The reaction mixture was placed in a 300 cc autoclave Crystallization in the autoclave was effected at 130° C. at autogenous pressure for 19 hours. The solid product was filtered, washed, dried and analyzed Washing was accomplished by extraction with water in a Soxhlet apparatus. Analysis proved the product to contain 8.2% Si, 43.6% P and 48.2% Al, percentages atomic.

Figure 8:
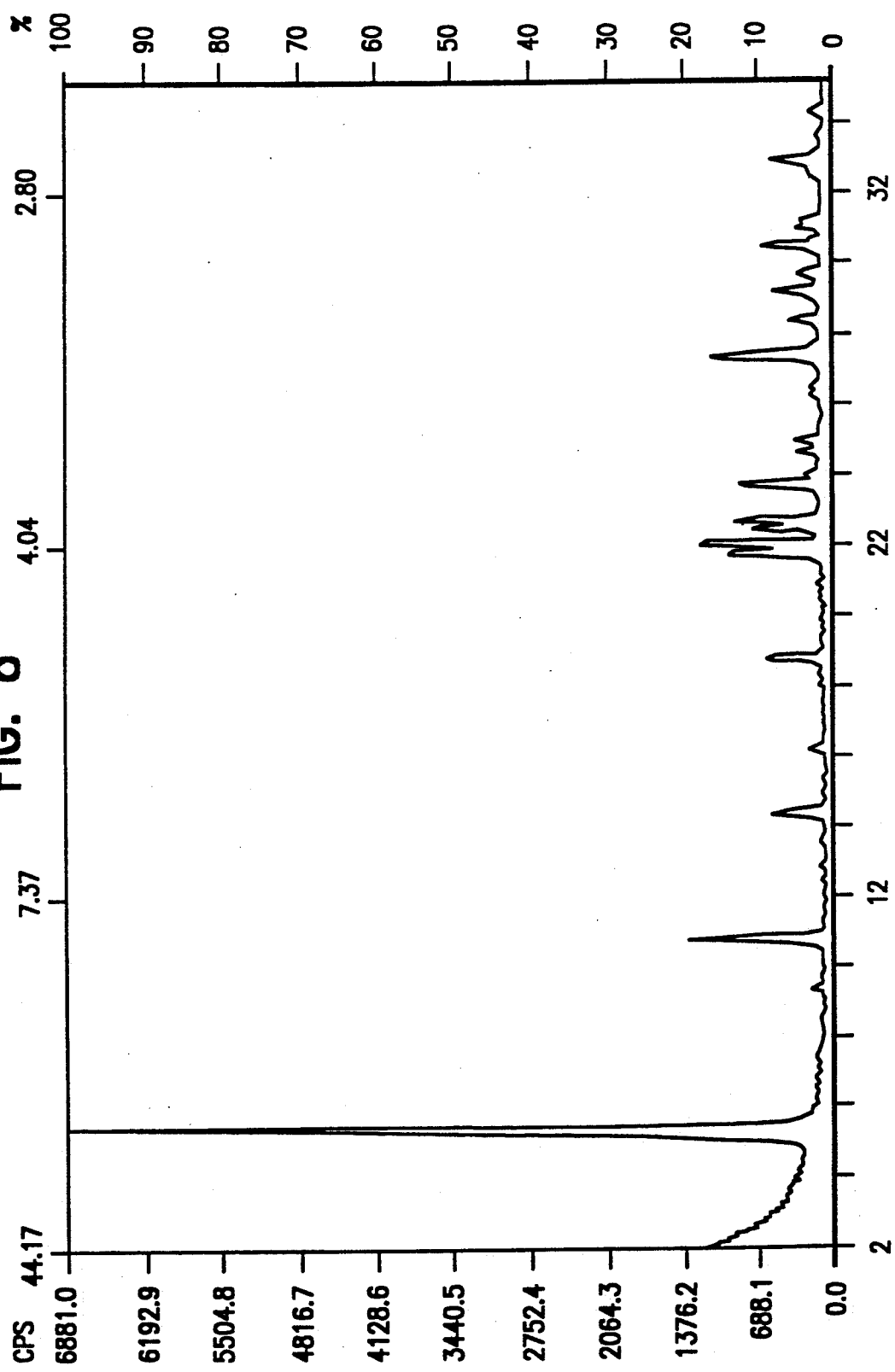
FIG. 8 depicts the X-ray diffraction pattern of the product of Example 8.

The X-ray diffraction pattern of the as-synthesized product crystals is shown in FIG. 8, with the diffraction data presented in Table IX.

TABLE IX

| Interplanar d-Spacings (A) | Observed 2x Theta | Relative Intensities (I/I°) |
| --- | --- | --- |
| 16.456 | 5.37 | 100 |
| 9.489 | 9.32 | 2 |
| 8.214 | 10.77 | 18 |
| 6.198 | 14.29 | 3 |
| 6.155 | 14.39 | 6 |
| 5.471 | 16.20 | 2 |
| 4.737 | 18.73 | 8 |
| 4.090 | 21.73 | 12 |
| 4.046 | 21.97 | 16 |
| 3.967 | 22.41 | 8 |
| 3.927 | 22.64 | 11 |
| 3.765 | 23.63 | 11 |
| 3.718 | 23.93 | 2 |
| 3.627 | 24.54 | 3 |
| 3.580 | 24.87 | 3 |
| 3.274 | 27.24 | 4 |
| 3.158 | 28.26 | 4 |
| 3.076 | 29.03 | 6 |
| 3.023 | 29.55 | 3 |

EXAMPLE 9

A solution containing 49.52 g aluminum trisecbutoxide (97%), 6.44 g tetrabutylsilicate and 3.18 g cyclohexylamine as directing agent (D) was stirred at room temperature for 5 minutes. A solution of 22.5 g in 45.2 g H$_2$O was added to the above mixture dropwise and predigested at room temperature with stirring for 2 hours.

Figure 9:
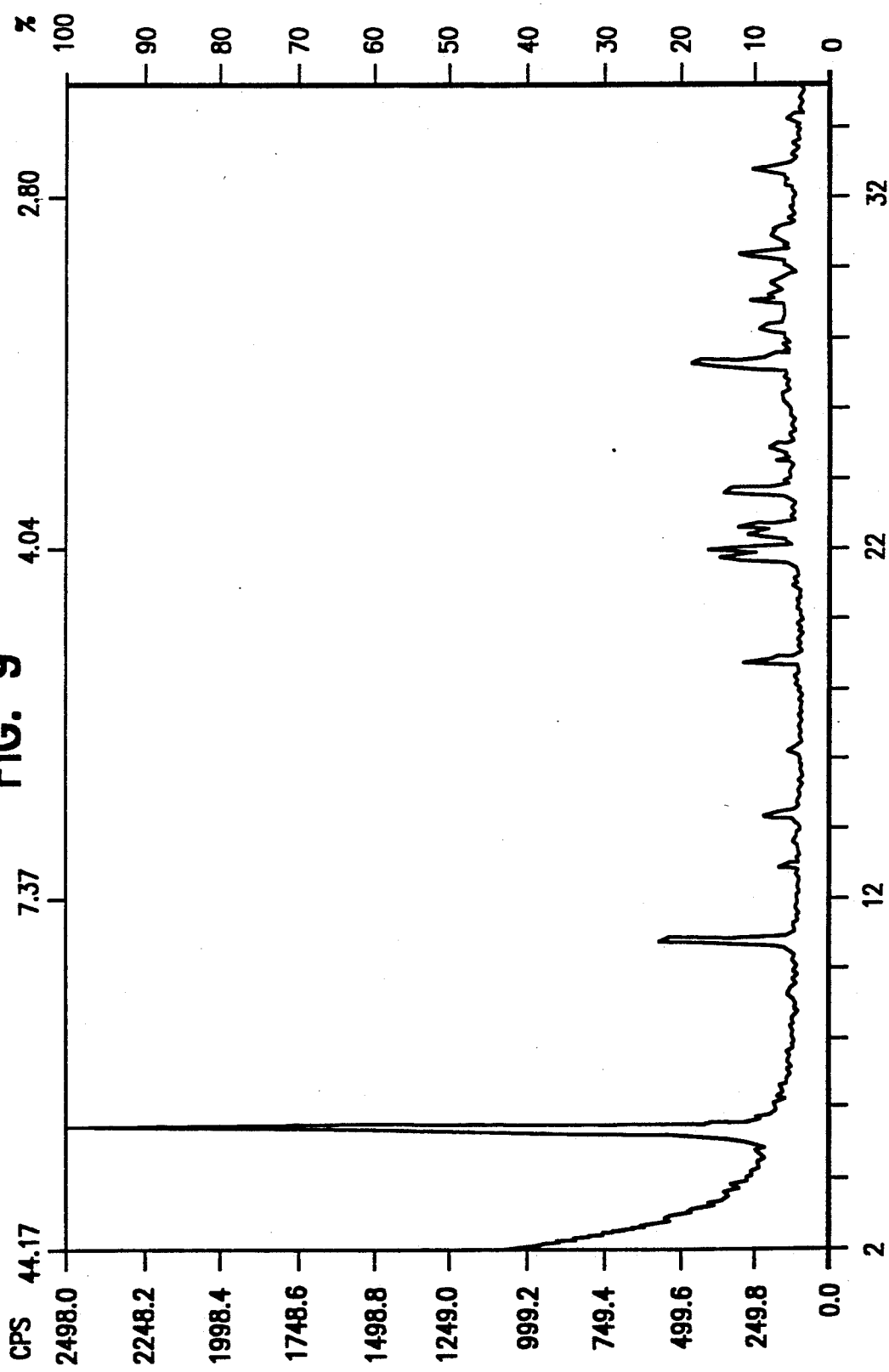
FIG. 9 depicts the X-ray diffraction pattern of the product of Example 9.

The reaction mixture was placed in a 300 cc autoclave. Crystallization in the autoclave was effected at 130° C. at autogenous pressure for 19 hours. The solid product was washed, filtered, dried and analyzed Analysis proved the product to contain 3.6% Si, 45.5% P, and 50.9% Al, percentage atomic. The X-ray diffraction pattern of the as-synthesized product crystals is shown in FIG. 9, with the diffraction data presented in Table X.

TABLE X

| Interplanar d-Spacings (A) | Observed 2x Theta | Relative Intensities (I/I°) |
| --- | --- | --- |
| 16.395 | 5.39 | 100 |
| 9.489 | 9.32 | 1 |
| 8.207 | 10.78 | 19 |
| 6.198 | 14.29 | 2 |
| 6.159 | 14.38 | 4 |
| 5.471 | 16.19 | 2 |
| 4.740 | 18.72 | 8 |
| 4.093 | 21.71 | 11 |
| 4.053 | 21.94 | 12 |
| 3.971 | 22.39 | 6 |
| 3.934 | 22.61 | 8 |
| 3.767 | 23.62 | 10 |
| 3.725 | 23.89 | 1 |
| 3.632 | 24.51 | 2 |
| 3.277 | 27.21 | 13 |
| 3.082 | 28.97 | 5 |
| 3.062 | 29.16 | 2 |
| 3.029 | 29.49 | 2 |

EXAMPLE 10

A solution containing 49.52 g aluminum trisecbutoxide (97%), 6.44 g of tetrabutylsilicate and 3.18 g cyclohexylamine was stirred at room temperature for five minutes. A solution of 22.5 g H$_3$PO$_4$ in 45.2 g of H$_2$O was added to the above mixture dropwise and predigested at room temperature with stirring for 2 hours. The gel was crystallized in a 300 cc bomb at 130° C. with stirring under autogenous pressure for 19 hours.

At the end of the heating period, the bomb was cooled to room temperature. The product was washed by decanting the supernatant liquid and then dried at room temperature. A 1 gram portion of the dried product was calcined in a tube furnace by the following procedure:

held under vacuum (0-0.05 torr of Hg) at room temperature for overnight exposure to 400 cc/minute N$_2$ flow, 1° C./minute to 50° C., held for 4 hours exposure to 400 cc/minute N$_2$flow, 1° C./minute to 538° C., held for 8 hours exposure to 200 cc/minute air and 200 cc/minute N$_2$ at 538° C. for 2 hours exposure to 400 cc/minute air flow for 4 hours exposure to 400 cc/minute N$_2$ cool down to room temperature.

The X-ray diffraction pattern of the resulting material indicated that its structure was unaffected by the calcination procedure.

What is claimed is:

1. A method for synthesizing a composition comprising crystals having a framework topology after heating at 110° C. or higher giving an X-ray diffraction pattern including—the following lines:

| Interplanar d-Spacings (A) | Relative Intensity |
| --- | --- |
| 16.4 ± 0.2 | vs |
| 8.2 ± 0.1 | w |
| 4.74 ± 0.05 | w | which comprises (i) providing a reaction mixture comprising sources of X oxide wherein X represents one or more elements of +3 valence, said sources of X oxide comprising an alkoxide, and at least one of Y oxide and Z oxide, wherein Y represents one or more elements of +5 valence and Z represents one or more elements of +4 valence, cyclohexylamine organic directing agent D, inorganic cations M and anions N, the components of said reaction mixture having the following relationship:

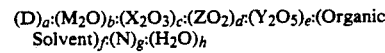

$(D)_a$:$(M_2O)_b$:$(X_2O_3)_c$:$(ZO_2)_d$:$(Y_2O_5)_e$:(Organic Solvent)$_f$:$(N)_g$:$(H_2O)_h$ where a, b, c, d, e, f, g and h are numbers satisfying the following relationships:

| |
| --- |
| a/(c + d + e) is less than 4, |
| b/(c + d + e) is less than 2, |
| d/(c + e) is less than 2, |
| f/(c + d + e) is less than 15, |
| g/(c + d + e) is less than 2, and |
| h/(c + d + e) is from 3 to 150; |

(ii) maintaining said mixture under sufficient conditions including a temperature of from about 105° C. to about 160 ° C. for a period of time of about 1 to 48 hours and (iii) recovering said composition from step (ii).

2. The method of claim 1 wherein the source of X oxide Z oxide is an alkoxide.

3. The method of claim 2 wherein the alkyl of said alkoxide comprises from 2 to 5 carbon atoms.

4. The method of claim 2 wherein said alkoxide is selected from the group consisting of ethoxide, n-propoxide, iso-propoxide, n-butoxide, sec-butoxide, n-pentoxide, iso-pentoxide and sec-pentoxide.

5. The method of claim 1 wherein X represents one or more elements of +3 valence selected from the group consisting of aluminum, iron, chromium, vanadium, molybdenum, arsenic, antimony, manganese, gallium and boron; Y represents one or more elements of +5 valence selected from the group consisting o phosphorus, arsenic, antimony and vanadium; and Z represents one or more elements of +4 valence selected from the group consisting of silicon, germanium and titanium.

6. The method of claim 1 wherein X represents aluminum, Y represents phosphorus, and Z represents silicon.

7. The method of claim 1 wherein said source of X oxide is aluminum alkoxide.

8. The method of claim 1 wherein said source of X oxide is aluminum iso-propoxide.

9. The method of claim 1 wherein said source of Y oxide is is phosphoric acid.

10. The method of claim 1 wherein said source of Z oxide is tetraethylorthosilicate.

11. The method of claim 1 wherein said source of X oxide is aluminum iso-propoxide and said source of Y oxide is phosphoric acid.

12. The method of claim 11 wherein said mixture has the following composition ranges:

| | |
|---|---|
| $ZO_2/Al_2O_3$ | 0 to 0.5 |
| $P_2O_5/Al_2O_3$ | 0.7 to 1.5 |
| $H_2O/Al_2O_3$ | 15 to 75 |
| $D/Al_2O_3$ | 0.2 to 0.75 | and wherein said mixture is maintained under conditions including a temperature of from about 120° C. to about 135° C. for a period of time of about 2 to 24 hours.

13. The method of claim 12 wherein said mixture has the following composition ranges:

| | |
|---|---|
| $ZO_2/Al_2O_3$ | 0 to 0.4 |
| $P_2O_5/Al_2O_3$ | 0.8 to 1.2 |
| $H_2O/Al_2O_3$ | 40 to 60 |
| $D/Al_2O_3$ | 0.25 to 0.5 |

14. The method of claim 1 wherein said crystals give an X-ray diffraction pattern including lines shown in Table IB of the specification.

15. The method of claim 1 wherein said mixture further comprises seed crystals in sufficient amount to enhance synthesis of said crystalline composition.

16. The method of claim 1 comprising replacing cations of the crystalline [metallo]aluminate composition recovered in step (iii), at least in part, by ion exchange with a cation or a mixture of cations selected from the group consisting of hydrogen and hydrogen precursors, rare earth metals, and metals from Groups IIA, IIIA, IVA, VIIA, VIIIA, IB, IIB, IIIB, and IVB of the Periodic Table of Elements.

17. The method of claim 5 wherein said inorganic cations M are hydrogen or a hydrogen precursor.

* * * * *

UNITED STATES PATENT AND TRADEMARK OFFICE
CERTIFICATE OF CORRECTION

PATENT NO. : 5,094,828
DATED : March 10, 1992
INVENTOR(S) : Cynthia T-W. Chu It is certified that error appears in the above-identified patent and that said Letters Patent is hereby corrected as shown below:

On the title page:  "SYNTHESIS OF LARGE-PORE" as the Title; Title should read --SYNTHESIS OF LARGE-PORE CRYSTALLINE COMPOSITION--.

claim 5, column 19, line 7, patent reads "o" where it should read --of--.

Signed and Sealed this

Twenty-ninth Day of June, 1993

Attest:

MICHAEL K. KIRK

Attesting Officer

Acting Commissioner of Patents and Trademarks